Patented May 12, 1925.

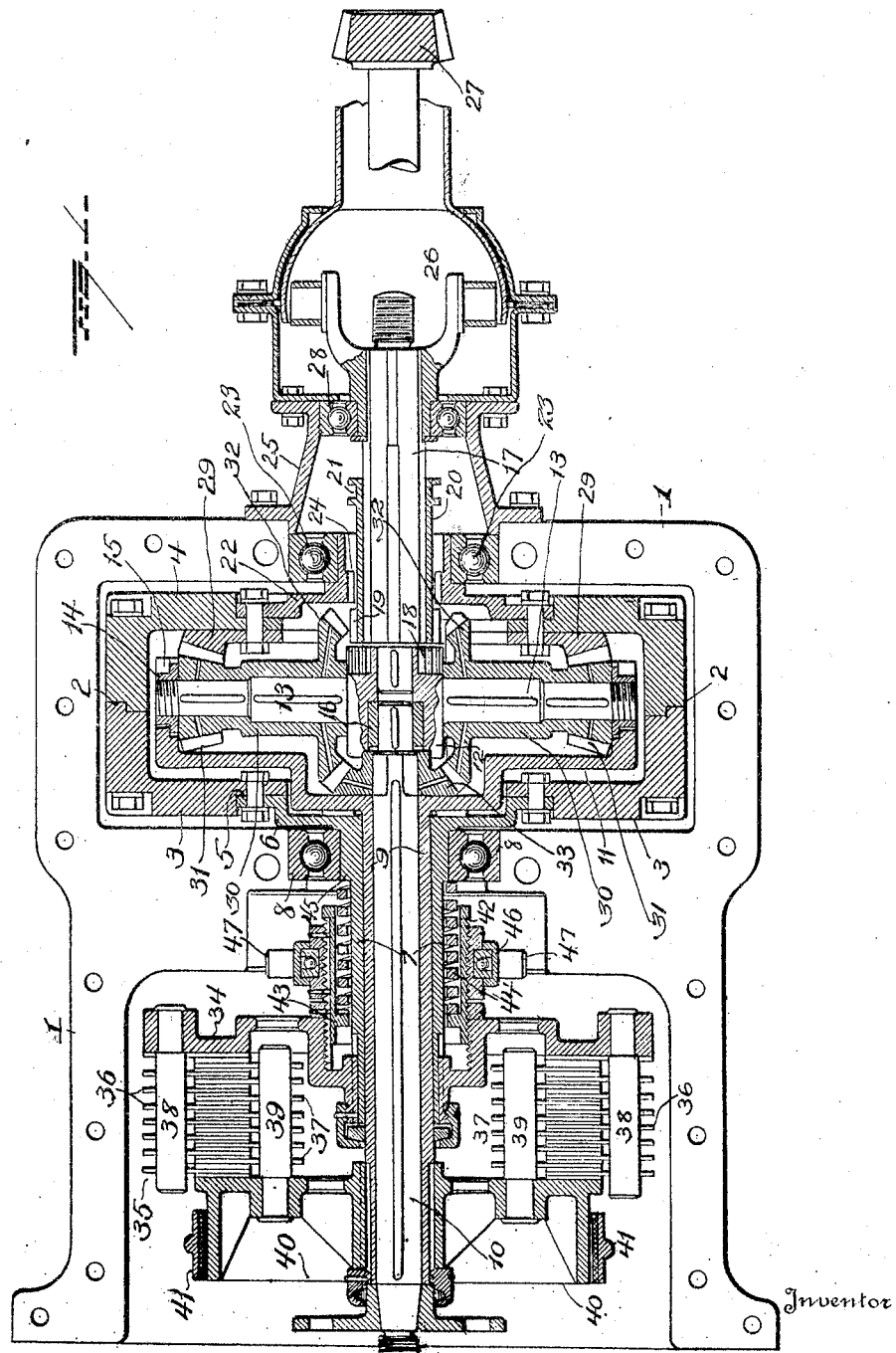

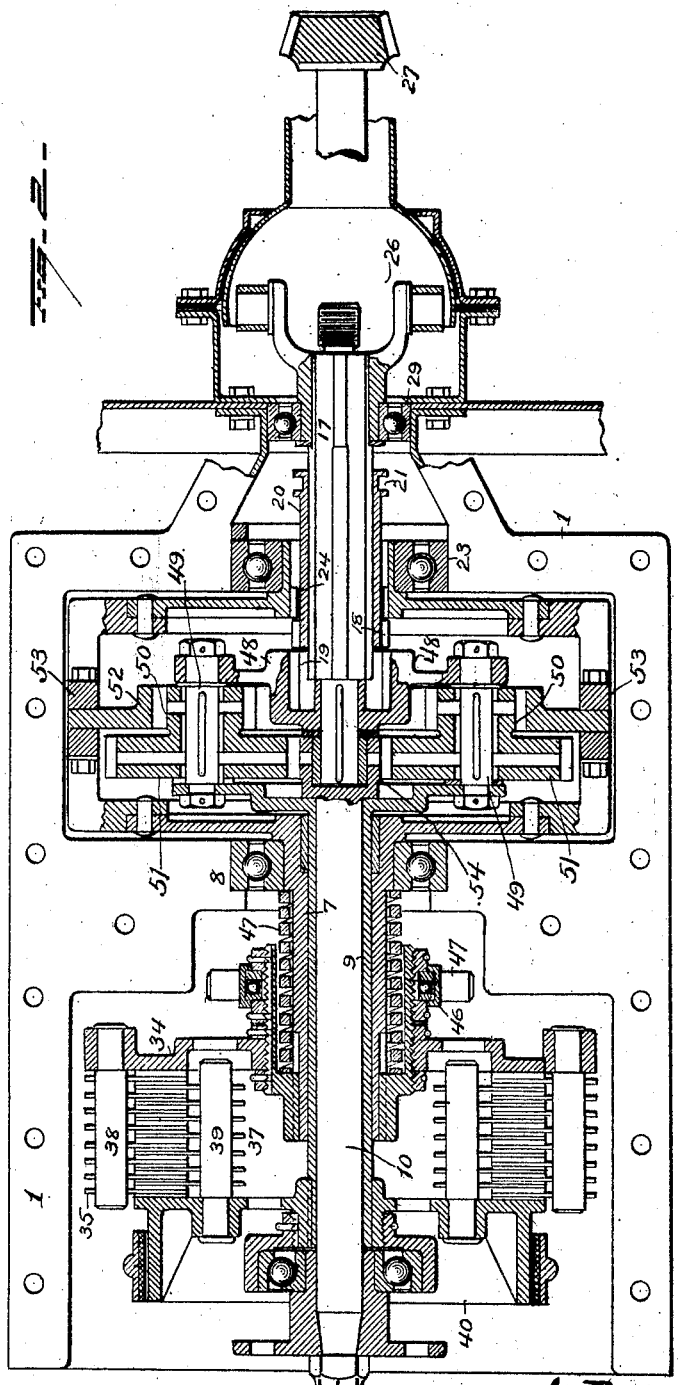

1,537,802

UNITED STATES PATENT OFFICE.

DENNIS P. COLLINS, OF PITTSBURGH, PENNSYLVANIA.

TRANSMISSION MECHANISM.

Application filed November 1, 1923. Serial No. 672,191.

*To all whom it may concern:*

Be it known that I, DENNIS P. COLLINS, a citizen of the United States, and resident of Pittsburgh, in the county of Allegheny and State of Pennsylvania, have invented certain new and useful Improvements in Transmission Mechanism; and I do hereby declare the following to be a full, clear, and exact description of the invention, such as will enable others skilled in the art to which it appertains to make and use the same.

This invention relates to improvements in transmission mechanism,—one object of it is to so construct such mechanism as to provide one driving and two driven members, all three of which may travel at different speeds or at the same speed according to the amount of resistance necessary to be overcome and so that all three of said members shall have force when in operation.

A further object is to so construct transmission mechanism that the action of a clutch forming part of the same shall be directly corelated to that of the driven members and not to the driving member whereby their speeds may be changed to meet the forces acting on the driven members.

A further object is to provide, in transmission mechanism, a mechanically actuated clutch of such construction that a variation in the action of its members will cause a decrease in speed and corresponding increase in torque of the driven member of a gearing mechanism without destroying the frictional adhesion or torque resistance of the clutching surfaces, whereby the action of the gearing mechanism shall be such that it may run as one or be automatically varied and controlled by the load on or work resistance of the driven member in one direction, and to provide a simplified control for stopping or reversing the driven member.

A further object is to provide transmission mechanism which shall be particularly adaptable for use with automobiles, wherein increased torque is necesary at the driving wheels to overcome road variables without the use of fixed ratio of gearing and their control.

With these and other objects in view, the invention consists in certain novel features of construction and combinations and arrangements of parts as hereinafter set forth and pointed out in the claims.

In the accompanying drawings;

Figure 1 is a longitudinal sectional view illustrating an embodiment of my invention;

Figure 2 is a similar view showing a modified construction.

In the drawing, the bottom member of a casing 1 is shown, but it will be understood that the casing will also include a top member so that the mechanism will be properly enclosed, and said casing is formed to provide seats for various bearing members, as hereinafter described.

A revoluble member or fly-wheel 2 is disposed within the casing and is made hollow and serves to enclose the differential gearings. The hollow member or fly wheel 2 may comprise two members 3—4 bolted together as shown in the drawings and the member 3 may be recessed to provide a seat 5 for a flanged head 6 at one end of a sleeve 7, between which latter and the casing anti-friction bearing devices 8 are located.

A sleeve or tubular shaft 9 is mounted within the sleeve 7 and within the tubular shaft 9, the driving shaft 10 is disposed. A head 11 at the inner end of the tubular shaft 9 is located in the hollow weight member or fly-wheel 2 and constitutes a carrier for the spider of planetary gearing also located within the wheel 2. The spider includes a hub 12 and radial arms 13, the free end portions of the latter being threaded for the reception of nuts 14 and the latter are located in notches or recesses 15 in the carrier 11. The hub of the spider receives anti-friction devices 16 to provide a bearing for the inner end portion of the driving shaft 10 and the inner end of a driven shaft 17 also enters the fly wheel and is disposed adjacent the hub of the spider. The spider hub is also made with an internally toothed clutch flange 18 to receive teeth 19 at one end of a clutch sleeve 20 mounted on and keyed to rotate with the driven shaft but capable of longitudinal sliding movement thereon,—said clutch sleeve being made at its outer end with a grooved enlargement 21 for connection of an operating lever (not shown) therewith. A hub member 22 is bolted to the fly-wheel 2 and between said hub member and the casing 1, anti-friction bearing devices 23 are interposed. The hub member 22 is also provided internally with an annular series of clutch teeth 24 for co-operation with the teeth 19 of the clutch sleeve 20. A conical bracket 25 may be bolted to the casing and carries a casing which houses the universal coupling 26, and the rear axle driving pinion is shown at 27. If desired, anti-friction bearing devices 28 may be located between the shank of the coupling devices on the driven shaft and the end portion of the conical bracket 25.

The planetary gearing within the hollow weight member or fly-wheel 2 includes a bevelled orbit gear 29 securely bolted to the inner face of the member 4 of the hollow fly-wheel 2. Hubs 30 are mounted on the arms 13 of the spider and each of these hubs carries at its respective ends, a bevel gear 31 to mesh with the orbit gear 29, and a bevel gear 32 with which a driving gear 33 on the driving shaft 10 meshes.

The sleeve 7 carried by the weight member or fly-wheel 2, has slidingly mounted thereon but rotatable therewith, one member 34 of a friction clutch 35. In the embodiment of the invention shown in the drawing, this friction clutch comprises two sets of friction plates 36—37, the plates 36 of one set alternating with the plates 37 of the other set, and the plates 36 may be carried by pins 38 projecting from the clutch member while the plates 37 may be mounted on pins 39 projecting from a brake wheel 40 which is keyed to the spider-carrier sleeve 9. A brake band 41 is provided for co-operation with the brake wheel and may be operated by means of suitable foot or hand lever mechanism, not shown. A cup 42 is threaded into the clutch member 34 and is made internally with an abutment 43 for one end of a spring 44, said spring encircling the sleeve 7 and bearing at its other end against a shoulder 45 on said sleeve. The spring normally tends to apply clutching pressure to the clutch member 34 and to the clutch disks, but such pressure may be regulated and controlled by a suitable foot or hand lever (not shown) suitably connected through a collar 46 and fork extensions 47.

It will be apparent that the gears 31—32 are free to rotate about the axes of the spider arms and to revolve about the axis of the spider. The force transmitted to the planetary gears by the driving gear meets resistance at the orbit gear 29, said gear being fixed to the weight member or fly-wheel 2 and the latter being connected with the clutch 35, the latter acting as a brake to supply the opposing force to the orbit gear, while the hollow fly-wheel supplies the inertia of rest or motion to prevent any violent or sudden shock of the gear and clutch members and assist in the starting and accelerating of the driven member of the planetary gearing under excessive load.

It will be understood that when the teeth 19 of the clutch sleeve 20 are in mesh with the clutch teeth 18 in the hub of the spider, forward motion will be imparted to the driven shaft. To reverse the direction of rotation of the driven shaft, the operator will move the clutch sleeve 20 so that its teeth 19 will engage the clutch teeth 24 in the hub member 22 of the fly-wheel and at the same time he will cause the spring 44 to be compressed in a manner to relieve the resistance offered by the friction clutch 35, and when the brake band or shoe 41 is tightened or compressed on the brake wheel 40 (with the use of a suitable foot pedal or lever), the spider will be held stationary and the orbit gear 29, fly-wheel and driven shaft 17 will be driven in the reverse or backward direction.

When the clutch sleeve 20 is engaged with the hub of the spider and the resistance of the driven shaft 17 is not great enough to break down adhesion of the members of clutch 35, the mechanism will run in unison. When the resistance of the driven shaft 17 is great enough to break down the adhesion of the members of clutch 35, there will be a lowering of speed and an increase of leverage imparted to the driven shaft 17 by increasing the length of time through which the force of driving gear 33 is transmitted to the extended cranking action of the spider arms by reason of the delayed rotation of the planetary gears carried by the spider about the axis of the driven shaft 17, in reacting upon the opposing force of orbit gear 29.

My improvements provide means for elastically connecting by predetermined force (clutch and spring) the driven member of a planetary or differential mechanism to a freely mounted weight member fixed to the orbit gear of same, whereby their opposing resistances may react on one another from the force of a driving member, to which each is attached through a planetary train, thereby differentiating the time through which variables in work may be done by a driven member in proportion to the volume required from infinite to unison and vice versa, without otherwise controlling these members.

It will be observed that one member of the friction clutch 35 is connected with the spider of the planetary gearing; that the other member of said clutch is connected with the orbit gear; that the weight member or fly-wheel is rotatable with the orbit gear; that the planetary train is interposed between the respective clutch members, and that the action of the clutch is directly corelated to that of the driven members and not to the driving member whereby their speeds may be changed to meet the forces acting on the driven members.

In Figure 1 of the drawing, the planetary gearing is shown as employing bevel gears, but it will be understood that spur gearing may be employed, as shown in Figure 2.

In Figure 2, the spider is indicated at 48 and said spider carries laterally projecting pins 49, on each of which spur gears 50, 51 are mounted,—the former meshing with an orbit gear 52 carried by the weight member 53, and the spur gears 51 meshing with the driving gear 54.

Various changes might be made in the details of construction of the elements embodied in my invention without departing from the spirit of the latter or limiting its scope, and hence I do not restrict myself to the precise details herein set forth.

Having fully described my invention what I claim as new and desire to secure by Letters-Patent, is:—

1. In transmission mechanism, the combination of a driving member, a driven member alined axially with the driving member, a friction clutch, a rotatable weight member connected with one member of the clutch, a train of planetary gearing connected with another member of the clutch and adapted to drive the rotatable weight member, means whereby the planetary gearing may be actuated by the driving member, and means whereby the driven member may be operatively connected with the planetary gearing or with the rotatable weight member.

2. In transmission mechanism, the combination with a spider, a train of planetary gears carried by the spider, and an orbit gear meshing with some of the planetary gears, of a weight member rotatable with the orbit gear, a friction clutch, connections between one member of the clutch and the spider, connections between another member of the clutch and the weight member, a driving shaft disposed concentric with the spider and the weight member and operatively connected with some of the planetary gears to actuate the same, a driven shaft, and means for connecting the driven shaft with the spider or with the orbit gear.

3. In transmission mechanism, the combination of a rotatably mounted spider, a train of gears carried by the spider, a clutch on the hub of the spider, an orbit gear meshing with some of the gears carried by the spider, a driving shaft mounted concentric with the spider and operatively connected with some of the gears on the spider, a weight member rotatable with the orbit gear, a clutch on said weight member, a driven shaft, means for operatively connecting the driven shaft with the clutch on the weight member or with the clutch on the hub of the spider, and a friction clutch, one member of the friction clutch being connected with the weight member and another member of the friction clutch being connected with the spider.

4. In transmission mechanism, the combination of a spider, planetary gears carried by the spider, an orbit gear meshing with some of the planetary gears, a weight member rotatable with the orbit gear, a friction clutch, a spring acting on the clutch to hold the members of the same in engagement, means for releasing the clutch members, connections between one member of the clutch and the weight member, connections between another member of the clutch and the spider, a driving shaft operatively connected with some of the gears on the spider, a driven shaft, and means for engaging the driven shaft with the spider or with the weight member.

5. In transmission mechanism, the combination of a spider, planetary gears carried by the spider, an orbit gear meshing with some of the planetary gears, a weight member rotatable with the orbit gear, a friction clutch having one member connected with the weight member and another member connected with the spider, yieldable means for holding the members of the clutch in engagement, means for releasing the clutch, a brake cooperating with that member of the clutch which is connected with the spider, a driving shaft operatively connected with some of the gears on the spider, a driven shaft, and means for operatively connecting the driven shaft with the spider or with the weight member.

6. In transmission mechanism, the combination of a driving shaft, a driven shaft alined therewith, planetary gearing interposed between the shafts, a hollow revoluble weight member housing the planetary gearing and connected to an element thereof, means whereby the planetary gearing will be actuated by the driving shaft, means for operatively connecting the driven shaft with an inner element of the planetary gearing or with the weight member, a friction clutch, a brake cooperating with one member of the clutch, connection between said member of the clutch and the planetary gearing, and connections between another member of the clutch and the weight member.

In testimony whereof, I have signed this specification in the presence of two subscribing witnesses.

DENNIS P. COLLINS.

Witnesses:
A. L. BANKER,
C. S. STALEY.